May 7, 1968 R. F. KLEIN 3,381,396
SELF-LOADER EARTH MOVING APPARATUS
Filed Dec. 19, 1966 5 Sheets-Sheet 1
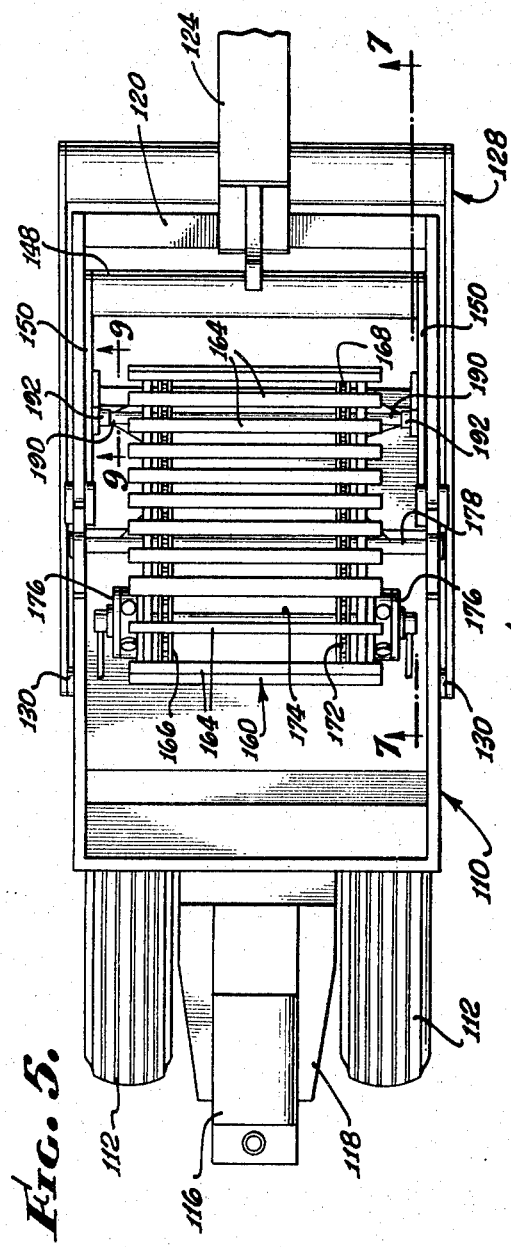
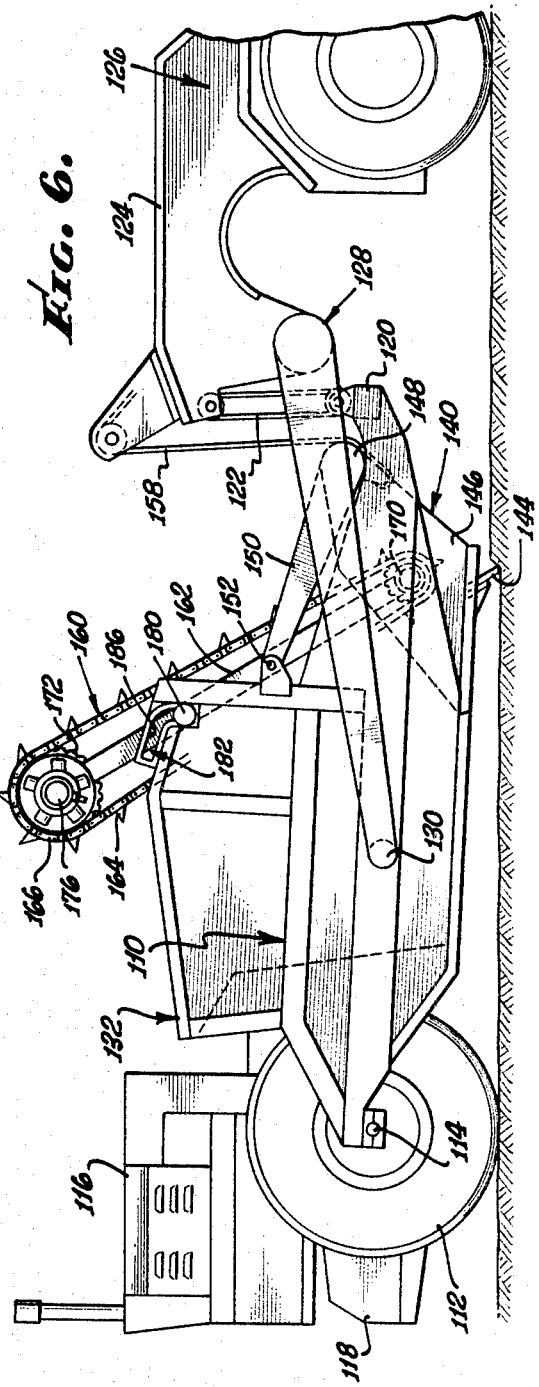
INVENTOR.
RICHARD F. KLEIN
By Huebner & Worrel
ATTORNEYS.

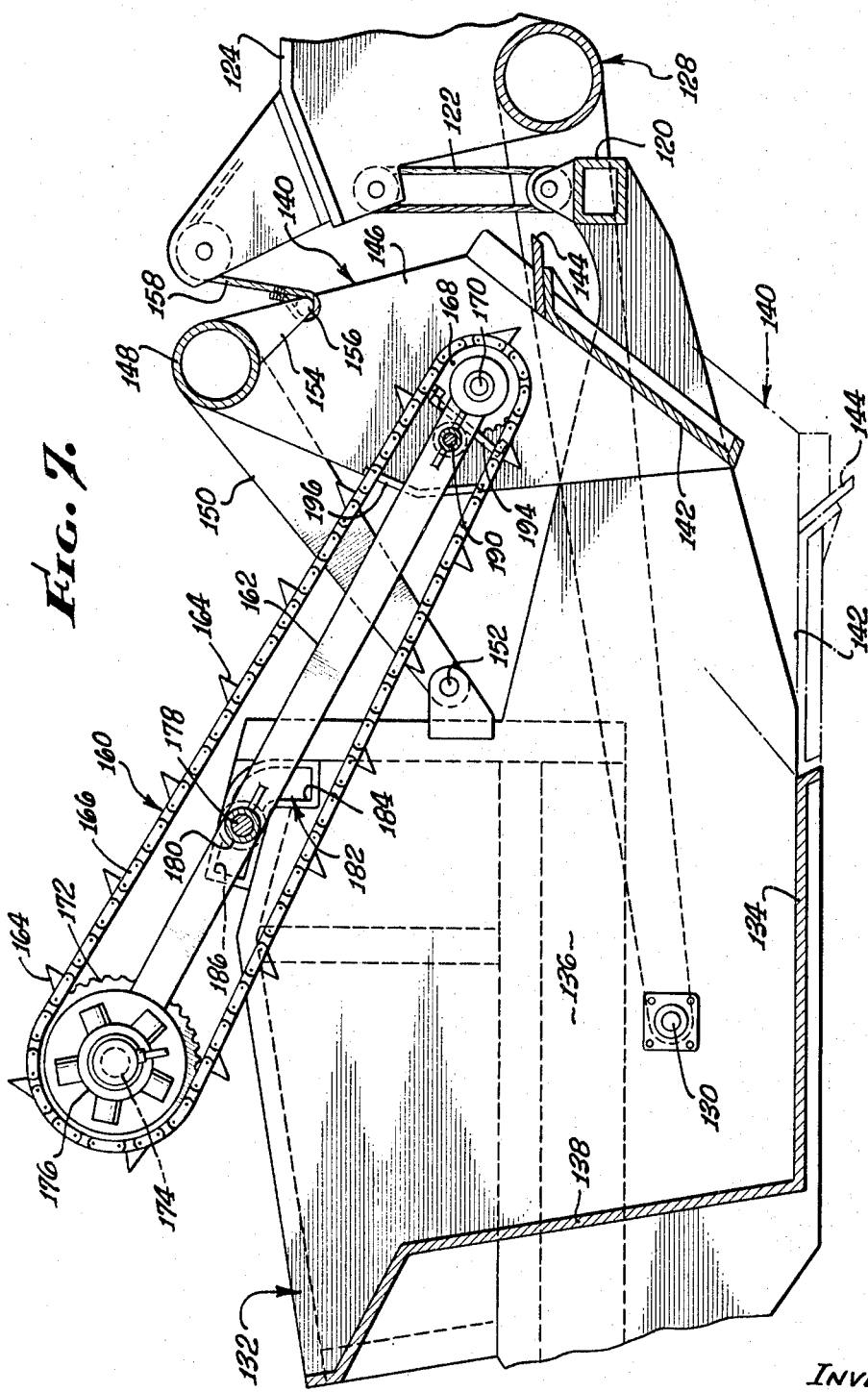

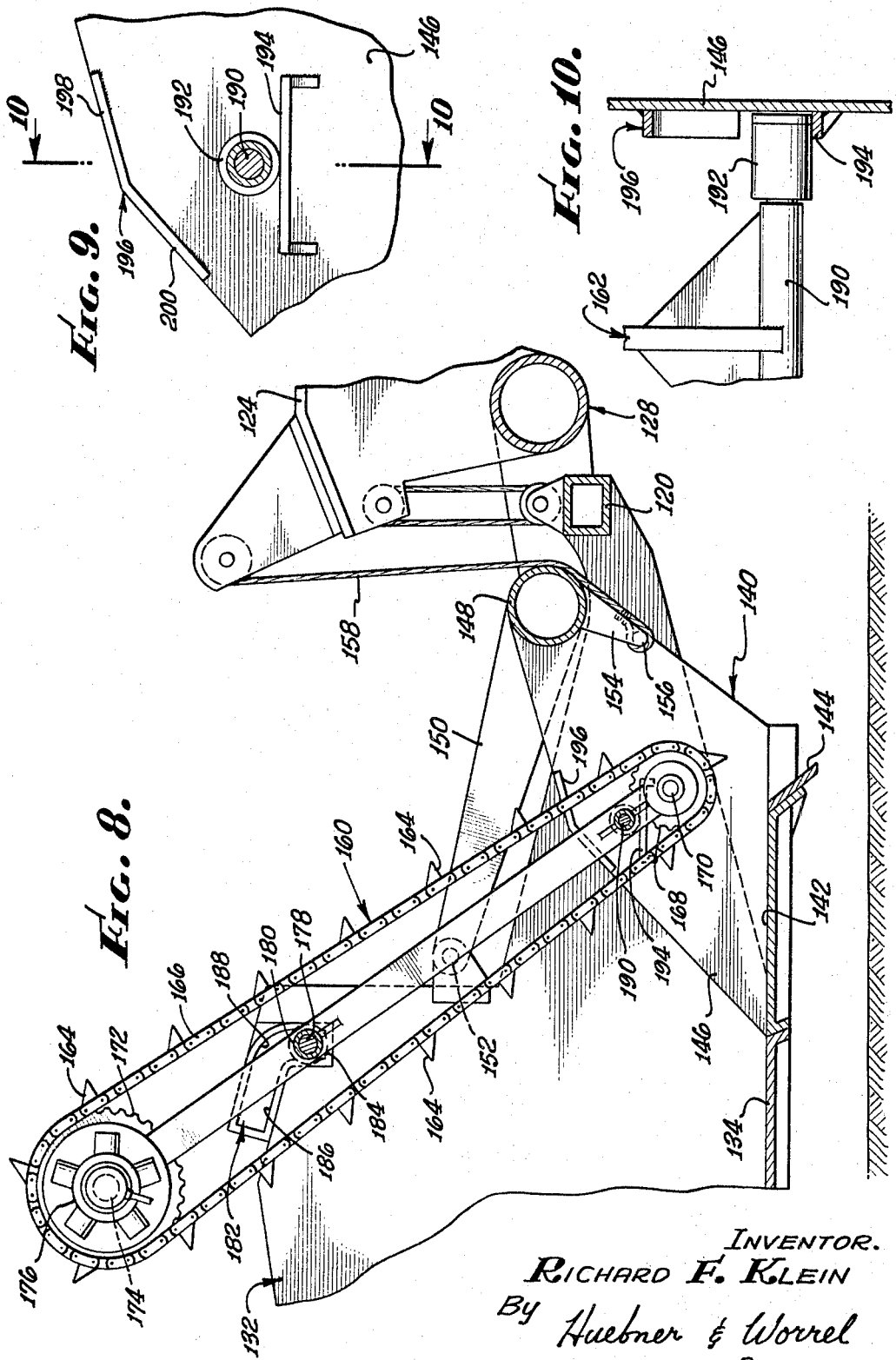

May 7, 1968 R. F. KLEIN 3,381,396
SELF-LOADER EARTH MOVING APPARATUS
Filed Dec. 19, 1966 5 Sheets-Sheet 4
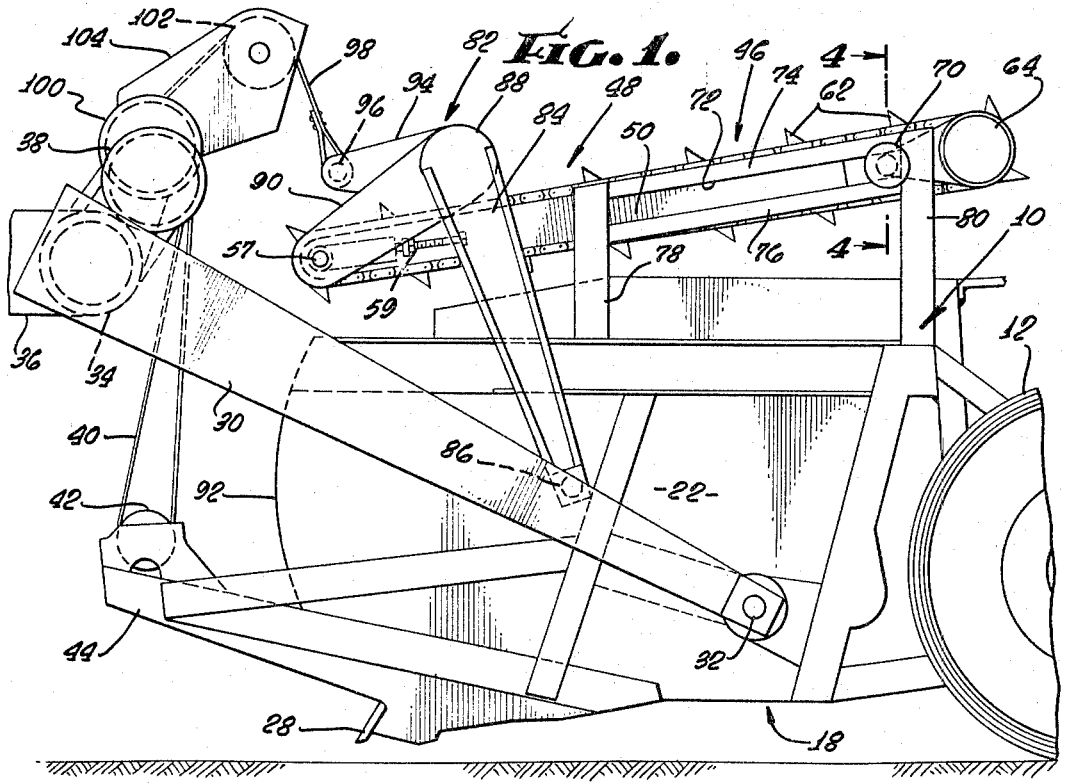
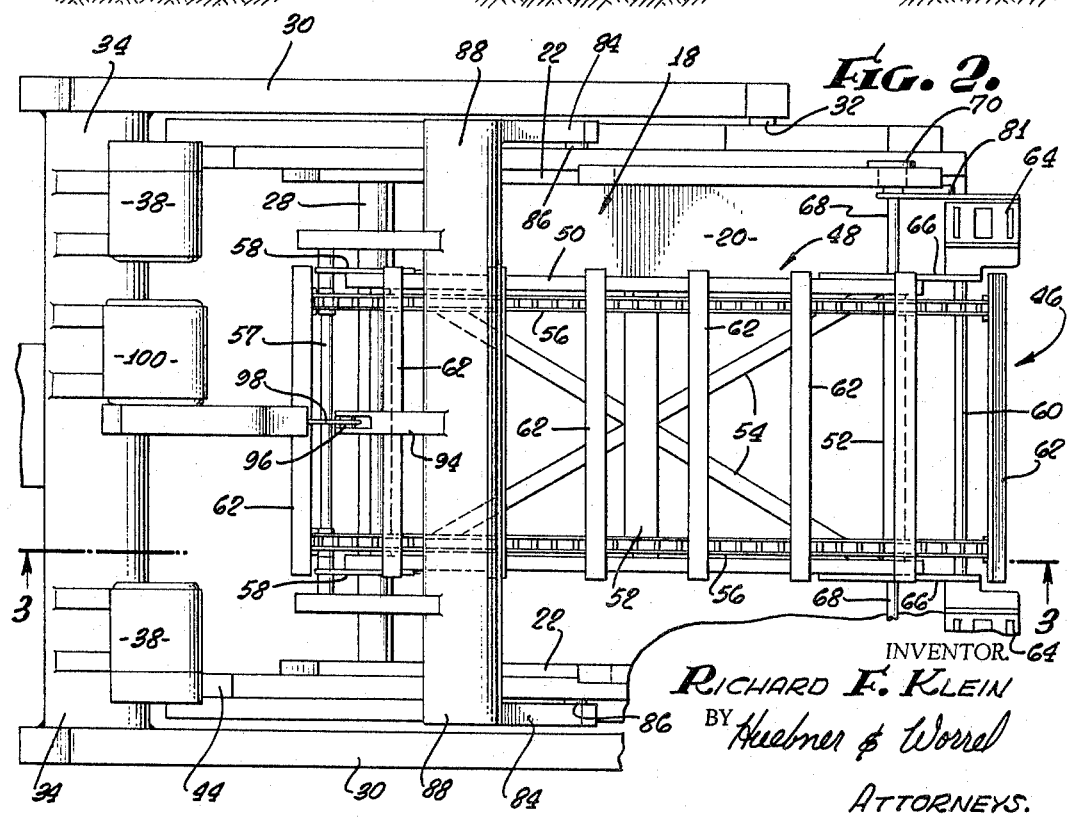
INVENTOR.
RICHARD F. KLEIN
BY *Huebner & Worrel*
ATTORNEYS.

May 7, 1968  R. F. KLEIN  3,381,396
SELF-LOADER EARTH MOVING APPARATUS
Filed Dec. 19, 1966  5 Sheets-Sheet 5
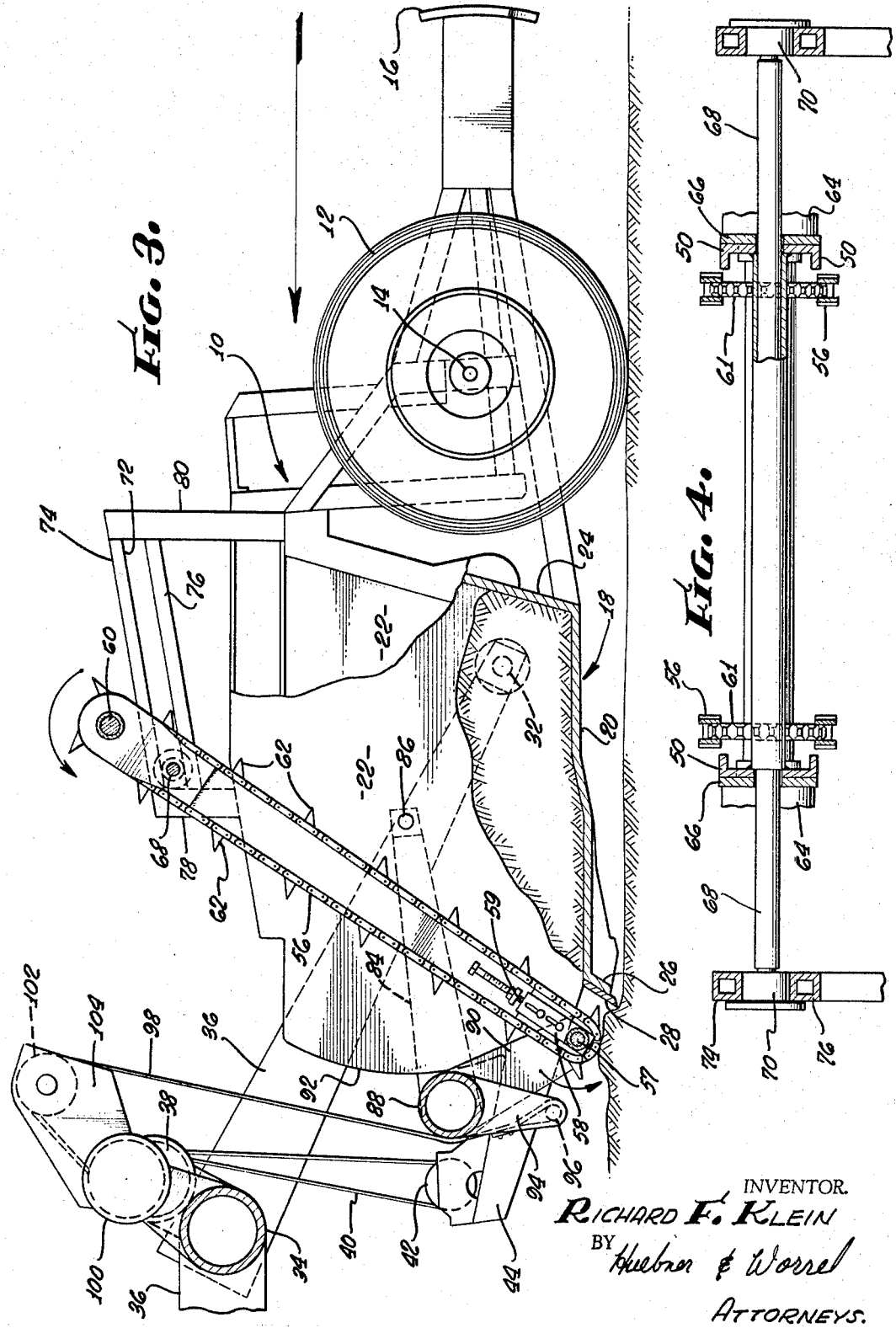
INVENTOR.
RICHARD F. KLEIN
BY Huebner & Worrel
ATTORNEYS.

United States Patent Office 3,381,396
Patented May 7, 1968

3,381,396
SELF-LOADER EARTH MOVING APPARATUS
Richard F. Klein, 20911 Via Verde,
Covina, Calif. 91722
Continuation-in-part of application Ser. No. 351,354,
Mar. 12, 1964. This application Dec. 19, 1966, Ser.
No. 611,511
14 Claims. (Cl. 37—8)

This is a continuation-in-part of my co-pending application Ser. No. 351,354, filed Mar. 12, 1964, and now abandoned, for "Self-Loader Earth Moving Apparatus."

The present invention relates to earth moving apparatus, and more particularly to earth moving apparatus for scraping, loading, transporting and dumping earth.

The type of earth moving apparatus to which the present invention relates is a box or bin mounted on wheels at least at the rear, and having means for being moved, as for example having drawbar means for towing by a tractor. The earth carrying box or bin has a bottom wall, side walls and a rear wall, but may be open at the front. A scraper blade is positioned proximate the front of the bottom wall so as to scrape earth and guide it up into the box or bin.

It is known in the art to provide an elongated conveyor unit on such earth moving apparatus, the conveyor unit having a forward end proximate the scraper blade of the earth moving apparatus and extending upwardly and usually somewhat rearwardly. By this means, the forward, lower end of the conveyor unit assists the scraper blade in scooping up earth which is loosened by the blade, and the conveyor unit also assists in proper loading of the box or bin by continually shifting newly scraped earth up over the top of the earth which has already been loaded into the box or bin. Additionally, during transport the conveyor unit acts as a forward wall to prevent the loose earth in the box from falling forwardly out of the apparatus.

Such conveyor units employed in prior art earth moving apparatus have been mounted at their forward, lower ends on pivoted blade structure for direct cooperation with the blade, and have been mounted at both ends for limited vertical shifting movement so that the lower end of the conveyor could move relative to the blade to permit the passage of large rocks and the like between the conveyor and the blade without damaging the conveyor, and so that the conveyor could move upwardly with an upward tilting of the blade to an earth carrying position of the apparatus.

However, such prior art devices employed some type of pivotal mounting for the conveyor units which resulted in a tightly constrained path of movement of the conveyors. Such a restricted pivotal movement generally unduly restricted the amount of floating movement of the conveyor during loading so that rocks or other irregularities in the earth being loaded were not always properly cleared by the conveyor. Additionally, this constrained pivotal movement of prior art conveyors employed on earth moving equipment has also generally limited the utility of the conveyor as a barrier to hold the earth in place during transport, and has tended to obstruct loading of the bin to its full capacity.

In view of these and other problems in the art, it is an object of the present invention to provide earth moving apparatus of the general character described wherein the conveyor unit is floatingly mounted by means of a novel slide-track guide system so as to be movable from a normal operative position with its front end lowered wherein it serves to assist loading of the apparatus and acts as a barrier against loss of dirt during transport, to a retracted, upper position wherein the conveyor unit leaves the earth carrying box or bin substantially completely open at its forward end for unloading purposes.

Another object of the present invention is to provide earth moving apparatus of the character described wherein the novel slide-track mounting of the conveyor unit is such that when the conveyor unit is moved from its lower, operative position to its upper, inoperative or retracted position, it moves in generally an arcuate path over the top of the earth that is contained in the box or bin of the apparatus, without substantially displacing any of the useful carrying space of the box and without tending to bind against the contents of the box.

Another object of the invention is to provide earth moving apparatus of the character described wherein the conveyor unit in its lower or operative position is floatingly mounted directly upon the earth in advance of the scraper blade so as to cooperate with the scraper blade in a novel manner to more efficiently pick up and store earth as the earth moving apparatus is moved along the ground, while freely riding over rocks and other irregularities in the earth which is being loaded.

Still further objects and advantages of the present invention will appear during the course of the following part of the specification, wherein the details of construction and mode of operation of several presently preferred embodiments are described with reference to the accompanying drawings, in which:

FIGURE 1 is a side elevation view of earth moving apparatus embodying one form of the present invention, with portions of the apparatus broken away at both ends, illustrating the conveyor unit in its retracted position.

FIGURE 2 is a top plan view of the apparatus shown in FIGURE 1.

FIGURE 3 is a longitudinal, vertical section taken on the line 3—3 in FIGURE 2 illustrating details of the structure and mounting of the conveyor unit, with the conveyor unit in its lower or operative position.

FIGURE 4 is a cross-sectional view taken on the line 4—4 in FIGURE 1, illustrating further details of the conveyor unit and its mounting.

FIGURE 5 is a top plan view of earth moving apparatus embodying another form of the invention.

FIGURE 6 is a side elevational view of the apparatus shown in FIGURE 5, showing the conveyor in its lowered position to assist in loading dirt into the bin.

FIGURE 7 is a longitudinal, vertical section of the apparatus shown in FIGURES 5 and 6 with the conveyor in a partially raised position.

FIGURE 8 is a fragmentary view similar to FIGURE 7, but with the conveyor in the lowered, operative position.

FIGURE 9 is an enlarged, fragmentary vertical section taken on the line 9—9 in FIGURE 5, illustrating the manner in which the lowered end of the conveyor is mounted for freedom of movement.

FIGURE 10 is a vertical section taken on the line 10—10 in FIGURE 9.

Referring to the drawings, the form of earth moving apparatus shown in FIGURES 1 to 4 includes a mobile frame 10 which is adapted to be supported on and drawn by a tractor unit, and is also supported on wheels 12 which are mounted on an axle 14 at the rear portion of frame 10. A bumper 16 projects from the frame to the rear of wheels 12 so that the apparatus can be pushed from the rear if necessary.

Mounted on the mobile frame 10 forward of the wheels, and preferably comprising an integral part of the frame so as to increase the structural strength of the apparatus, is a box or bin 18 for receiving, carrying and then dumping earth. The box 18 has a bottom wall 20, side walls 22 and a rear wall 24. Aside from the conveyor structure of the present invention, the front and top portions of the box are open. The forward edge of bottom wall 20 has a down-turned lip 26 upon which a scraper blade 28 is mounted so as to project obliquely forward and downward from the bottom wall 20, the blade 28 being adapted to scrape and scoop up earth so that the earth flows into the box or bin 18 generally in the manner illustrated in FIGURE 3.

A pair of drawbar members 30 are connected to the mobile frame 10 on opposite sides of the box 18 by suitable trunnions 32, the drawbar members 30 being connected to a tubular cross member 34. A support member 36 is integrally connected with cross member 34 intermediate the drawbar members 30, and extends forwardly for attachment to a tractor. The drawbar members 30, cross member 34 and support member 36 together constitute the drawbar or towing assembly for the apparatus.

While the present invention is shown and particularly described herein in connection with earth moving apparatus of the type supported at the rear on its own wheels and at the front on a tractor, it is to be understood that the invention also applies to apparatus of the type supported at both ends on its own wheels.

Mounted on the cross member 34 is a pair of box elevating winches 38, each of which has a cable 40 extending downwardly therefrom in a loop which engages a pulley 42 attached to a forwardly extending frame member 44 on the respective side of the apparatus. The box elevating winches 38 may be actuated electrically, hydraulically or otherwise, and will be operated to raise the front end of the apparatus so that the scraper blade 28 and the conveyor unit of the present invention are spaced above the ground for transport of the apparatus. The winches 38 are operated to allow cables 42 to extend so that blade 28 engages the ground as shown in FIGURE 3 when the apparatus is being towed along the ground for scooping up earth. During the loading operation, the cables 40 may be completely relaxed so that the entire weight of the apparatus is on the blade 28, or part of the load may be taken up by the cables 40, if desired.

Referring now to the conveyor apparatus, the conveyor unit is generally designated by the reference numeral 46. The conveyor unit 46 has a generally rigid, rectangular frame 48 which includes a pair of parallel side members 50, which, for rigidity, may be channel-shaped members. A plurality of transverse members 52 and cross members 54 connect the longitudinal members 50 of the frame.

A pair of continuous conveyor chains 56 are looped longitudinally about frame 48 adjacent the side members 50, the chains riding at the front end of the frame on suitable idler sprockets which are rotatable on a transverse shaft 57 supported at the front of frame 48. Shaft 57 is engaged in a pair of support arms 58 which project forwardly from frame side members 50 and are longitudinally adjustable with respect to the side members 50 by means of tensioning devices 59 for tightening the chains.

Mounted at the rear of conveyor frame 48 is a transverse shaft 60 having chain drive sprockets 61 thereon. Supported on the chains 56 at regular intervals around the chain loops are transverse conveyor flights or blades 62 which are rigid earth moving members. The blades 62 shown in the drawings are of closed, triangular cross-section for rigidity, although blades of any suitable shape may be employed.

The rear shaft 60 is driven by a pair of motors 64 which may be electrically, hydraulically or otherwise actuated, the motors 64 being supported partly on support arms 66 which project rearwardly from the respective frame side members 50. The shaft 60 is rotated anticlockwise as viewed in FIGURES 1 and 3, so that the conveyor blades 62 will be moving rearwardly at the lower or forward end of the conveyor unit as best illustrated in FIGURE 3 to scoop the dirt which has been loosened forwardly of the scraper blade 28 to the rear and upwardly into the box 18. The conveyor blades 62 along the bottom or rearwardly facing side of the conveyor frame are all moving upwardly and rearwardly so as to continuously shift the newly scooped earth back over the earth already deposited in the box for most efficient and complete filling of the box.

The conveyor unit 46 is independently supported adjacent its front and rear ends in a novel manner now to be described.

The rear or upward end portion of the conveyor unit is provided with a transverse support shaft 68 which projects outwardly from the sides of the conveyor frame 48 and has rollers 70 at its ends. Each of the rollers 70 rides in a slot 72 defined between spaced, parallel upper and lower track members 74 and 76, respectively, which are supported at their ends on upwardly extending frame members 78 and 80. In one embodiment of the invention which has been built and tested the slots 72 were straight as shown in the drawings, and inclined upwardly and to the rear. This arrangement, when coupled with the front or lower mounting for the conveyor unit shown and described herein, produced a satisfactory pattern of movement for the conveyor unit.

Additional support for motors 64 is provided by brackets 81 which connect the motors 64 to support shaft 68.

The forward conveyor support assembly is designated generally by the reference numeral 82, and includes a pair of arms 84 on opposite sides of the box 18 which are supported on respective pivot members 86 connected to the mobile frame 10 and generally centrally located with respect to the side walls 22. A pair of arms 90 are integrally connected to the cross member 88, as by welding, and extend generally downwardly from cross member 88, the arms 90 supporting the front shaft 57 of the conveyor unit proximate the free ends of the arms.

By this construction of the forward support assembly 82 the forwardly extending arms 84, tubular cross member 88 and downwardly extending arms 90 together comprise a unitary structure which is pivoted on the pivot members 86, whereby the front conveyor shaft 57 swings in an arcuate path having a radial center at the pivot members 86. The front edges 92 of the side walls 22 of the box are preferably arcuately curved to maintain maximum load carrying ability without obstructing the free swinging movement of the forward conveyor support assembly 82. Use of the large tubular cross member 88 provides the necessary rigidity to this forward support assembly 82 so that there will be completely lateral stability of the conveyor unit and it will not wobble or have a tendency to bind. By this means, the conveyor unit 46 will at all times be free to float in its operative position as shown in FIGURE 3 when earth is being scooped and deposited into the box 18. The use of two sets of arms, 84 and 90, as part of the support assembly 82, permits the rigid tubular cross member 88 to be spaced substantially above the forward end of the conveyor unit 46, so that it will not in any way interfere with operation of the conveyor unit.

The cross member 88 also provides means for attachment of a winch device to the forward end of the conveyor unit for selective control of the vertical position of the conveyor unit. Thus, a central arm 94 is integrally attached to the tubular cross member 88, as by welding, and extends generally downwardly and forwardly from the cross member 88. Central arm 94 carries a transverse pin 96 proximate its free end, about which the free end of a cable 98 of winch 100 is attached. The winch 100 is suitably mounted on the cross member 34 of the drawbar assembly, and the cable extends upwardly and rearwardly over a pulley 102 which is mounted in a bracket 104 extending from winch 100, the cable then extending downwardly to its connection with central arm 94.

By providing the combination of the rearward slide track mounting for the conveyor unit and the forward pivotal mounting with the relatively large radius between pivot members 86 and the front shaft 57, the conveyor unit is movable by winch 100 from its lowered, operative position as shown in FIGURE 3, wherein the forward end of the conveyor unit rides upon the earth in front of the scraper blade 28, to an uppermost position as best shown in FIGURE 1 wherein the entire conveyor unit 46 is disposed above the box 18 and the conveyor unit 46 completely clears the open front end of the box so that the earth which has been transported in the box can be dumped without any obstruction whatsoever at the front.

Normally, the conveyor unit will be in its upper, unactuated position of FIGURE 3 during dumping and while the apparatus is being transported unloaded, and will be in its lower position during loading and during transport while loaded. Motors 64 will normally only be actuated during the loading operation. When the conveyor unit is in its lower position for transport with the box full, the conveyor flights or blades 62 will normally be stationary and the conveyor unit will act as a wall or barrier at the front of the box to prevent loss of earth during transport.

During the scraping and loading operation, when the conveyor unit is in its lower, operative position of FIGURE 3, the winch 100 can be completely released so that the entire weight of the conveyor unit rides on the ground in front of the scraper blade and on the earth piled in the box, or the winch 100 may be actuated to adjust the position of the conveyor unit or the proportion of the conveyor weight applied, according to the requirements of the particular operation.

A very important result of this novel mounting of the conveyor unit is that all increments of movement from the lowermost position shown in FIGURE 3 to the uppermost position shown in FIGURE 1 are in an up-and-over path with respect to the earth which is stored in the box. Thus, the movement of the conveyor unit is not such as to limit or reduce the useful volume of the box. When the box is filled to capacity, this pattern of movement is such that when winch 100 is actuated to raise the conveyor unit out of the way for dumping, the conveyor unit easily clears the pile of earth in the box, and is not jammed into the pile, which would either prevent dumping or make it more difficult. Also, if the conveyor unit tends to ride upwardly during the loading operation illustrated in FIGURE 3 when the box becomes full, it will be free to move upwardly and will not jam against the earth stored in the box.

FIGURES 5 to 10 illustrate another form of the present invention wherein the upper portion of the conveyor or elevator unit is guided in a slide track which curves upwardly and rearwardly from a generally vertically oriented forward portion to a primarily horizontally oriented rearward portion, and wherein the forward, lower end of the conveyor or elevator unit is freely floating within prescribed limits during operation of the apparatus.

The earth moving apparatus shown in FIGURES 5 to 10 includes a mobile frame 110 which is supported at its rear portion on wheels 112 which are mounted on an axle assembly 114. An engine 116 is mounted on a rear frame portion 118 and serves to provide the necessary power to actuate the conveyor or elevator of the present invention. A transverse forward frame member 120 is adjustably supported by an elevating cable suspended from gooseneck 124 attached to a tractor 126. Adjustment of the cable 122 permits the entire earth moving apparatus to be adjusted between a loading position as generally illustrated in FIGURE 6 wherein the scraper blade engages the ground, and a raised position as generally illustrated in FIGURE 7 wherein the scraper blade clears the ground for transport of the unit. A drawbar assembly 128 is connected at its front end to the gooseneck 124 and at its rear end to the frame 110 by trunnions 130.

The primary bin or bowl 132 of the earth moving apparatus is generally designated by the reference numeral 132 and includes a floor 134, side walls 136 and a rear wall 138. Although the rear wall 138 is illustrated in the drawings as being integrally connected with the floor and side walls, it is to be understood that the rear wall may alternatively comprise an ejector plate forming a part of earth ejecting apparatus in accordance with conventional practice.

A forward bowl extension 140 serves to lengthen the load carrying bed of the apparatus when it is operatively disposed as illustrated in FIGURE 6, but is adapted to swing forwardly and upwardly out of the way as generally illustrated in FIGURE 7 for easy dumping. The bowl extension 140 includes a bottom plate 142 which, in the operative position of the bowl extension is engaged against and generally aligned with the floor 134 of the primary bowl 132. Bowl extension 140 also includes a pair of side plates 146 extending upwardly and forwardly from the bottom plate 142, and a transverse support tube 148 is rigidly connected between the upper, forward ends of the side plates 146 A pair of arms 150 extend rearwardly from the support tube 148 above side plates 146, and the arms 150 are pivotally connected to the frame at their rear ends on a generally horizontal axis by means of suitable pivot pins 152. Thus, the bowl extension 140, transverse support tube 148 and arms 150 together form a single rigid unit which pivots about the axis of the pivot pins 152. An arm 154 is integrally attached to the transverse tube 148, extending downwardly therefrom, and the arm 154 carries a transverse pin 156 proximate its free end, about which the free end of a winch cable 158 is attached for raising and lowering the bowl extension 140.

The conveyor or elevator unit 160 is generally similar in construction to the conveyor unit 46 shown in FIGURES 1 to 4, except for the mounting thereof. Accordingly, the conveyor or elevator unit 160 includes a generally rectangular frame 162 and a series of transversely arranged flights or blades 164 supported on a pair of endless chains 166 positioned generally at opposite sides of the conveyor unit 160. At their forward, lower ends the chains 166 are supported in respective idler sprockets 168 mounted on the forward shaft 170. At their rearward, upper ends the chains 166 are mounted on respective drive sprockets 172 which are affixed to transverse shaft 174 driven by a pair of drive motors 176 which may be electrically, hydraulically or otherwise actuated. Typically, electrical or hydraulic power will be supplied to the chain drive motors 176 by the engine 116 that is mounted on the rear of the frame.

The primary means for supporting the conveyor or elevator unit 160 includes primary transverse guide shaft 178 mounted on the conveyor frame 162 somewhat above and to the rear of the center gravity of the conveyor unit 160, and having laterally outwardly projecting rollers 180 that are engaged in respective guide slots 182 on opposite sides of the frame 110 of the apparatus at the top thereof. In the form of the invention shown in FIGURES 5 to 10 these guide slots 182 each include a forward, lower slot portion 184 which is generally vertically oriented and an upper, rearward slot portion 186 which extends primarily rearwardly and somewhat upwardly from the slot portion 184 in a principally horizontal orientation. The lower and upper slot portions 184 and 186, respectively, are connected by an intermediate curved slot section 188 providing a smoothly contoured path of movement for the rollers 180 between the lower slot portions 184 and the upper slot portions 186.

Support means is also provided for the forward portion of the conveyor or elevator unit 160, primarily for the purpose of defining the limits of movement of the forward, lower end portion of the conveyor relative to the bowl extension 140. This forward support means includes a transverse guide shaft 190 mounted a short distance above and to the rear of the idler sprocket shaft 170, the guide shaft 190 having rollers 192 at its ends. A generally horizontal lower limiting plate 194 is integrally mounted on each of the side plates 146 of bowl extension 140 so as to project inwardly therefrom, and the guide shaft rollers 192 will engage this lower limiting plate 194 so as to define the lowermost point of movement of the forward, lower end portion of the conveyor or elevator unit 160 with respect to the bowl extension 140. Spaced above the lower limiting plate 194 on each of the bowl extension side plates 146, as best illustrated in FIGURES 9 and 10, is an upper limiting plate 196 having a forwardly and upwardly inclined forward section 198, and a more steeply inclined rearward section 200.

When the apparatus is positioned for loading earth into the bowl as illustrated in FIGURES 6 and 8, the conveyor or elevator unit 160 will incline somewhat rearwardly from its lower end to its upper end, but will be in a primarily vertical position, in which the rollers 180 of the primary guide shaft 178 will seat in the bottoms of the lower slot portions 184 of guide slots 182, and the forward guide shaft rollers 192 will rest against the lower limiting plates 194. As earth is being loaded as illustrated in FIGURE 6, the conveyor chain drive sprockets 172 will be power driven clockwise as illustrated in FIGURE 6 so that the conveyor flights or blades 164 will assist in scooping up the earth and piling it in the bowl or bin. In this position, the bowl extension 140 forms an operative extension of the primary bowl 132, with the bottom plate 142 of the bowl extension engaged against and extending forwardly from the floor 134 of the primary bowl. In this position of the conveyor or elevator unit 160, the lower, forward end of the conveyor is free to swing forwardly and upwardly between the lower and upper limiting plates 194 and 196, respectively, to accommodate variations in the earth during the loading. In the event a large obstruction such as a large rock is encountered during loading, the entire conveyor or elevator unit 160 is free to shift vertically upwardly, with the primary guide rollers 180 moving upwardly in the generally vertically oriented lower slot portion 184, and the lower, forward guide rollers 192 being freely movable between the plates 194 and 196.

In this operative position of the conveyor or elevator unit 160 most of the weight of the elevator unit is available for the loading operation because of the generally vertical orientation of the conveyor. In the event it is desired to apply even more of the weight of the conveyor vertically during loading, the primary guide shaft 178 may be bent as with a drop axle or may be repositioned so as to place the primary rollers 180 underneath the conveyor frame 162 as illustrated in FIGURE 7, and consequently somewhat to the rear of the frame 162 as it is positioned in FIGURES 6 and 8, thus tilting the entire conveyor or elevator unit 160 more forwardly in its operative position as shown in FIGURES 6 and 8, which is a more vertical or upright position.

When it is desired to dump the earth that is loaded in bowl 132 and bowl extension 140, the winch cable 158 is raised so as to swing the bowl extension 140 upwardly in the manner illustrated in FIGURE 7, thereby opening the floor for dumping, and also raising the conveyor or elevator unit 160 out of the way. When the bowl extension 140 is thus raised, the lower limiting plates 194 thereon will swing the conveyor unit 160 in an up-and-over path with respect to the earth in the box, with the central portion of the conveyor unit 160 being guided upwardly and rearwardly by movement of the primary rollers 180 upwardly and rearwardly through the guide slots 182. FIGURE 7 illustrates an intermediate position of the conveyor or elevator unit 160 before it has been swung completely upwardly and somewhat rearwardly to its upper, unactuated position which is the position that it is disposed in during transport of the apparatus. By having the primary rollers 180 disposed somewhat above and to the rear of the center gravity of the conveyor unit 160, the forward portion of the conveyor unit will at all times be gravity biased downwardly. On the other hand, by having the primary rollers 180 disposed a substantial distance forwardly and downwardly from the drive sprocket shaft 174, the upper end portion of the conveyor unit will swing downwardly to a generally horizontal position when the forward end of the conveyor is raised all of the way up to the inoperative position, so as to reduce the overall height of the apparatus during transport. Accordingly, the conveyor or elevator unit 160 may be quite long and heavy which is desirable for most efficient earth loading, while at the same time the conveyor unit is moved for transport into a generally horizontal positon wherein it does not add materially to the height of the primary bowl 132. This positioning of the primary rollers 180 a substantial distance forwardly and below the drive sprocket shaft 174 additionally permits the guide slots 182 to be disposed adjacent the top of the primary bowl without requiring that it be placed on frame extensions a substantial distance above the primary bowl, and also results in placement of considerably more than one-half of the weight of the conveyor or elevator unit 160 on the frame in the region of guide slots 182 so as to lessen the load of the conveyor on the forward support structure when the conveyor is in its inoperative position for transport. It is to be noted that when the conveyor is shifted from its position of FIGURE 7 to its fully inoperative position, the lower limiting plate 194 because of its incline will serve to cam the rollers 192 rearwardly so as to smoothly shift the primary rollers 180 rearwardly on the upper slot portions 186 to the rearwardmost extent of the slot portions 186.

While the instant invention has been shown and described herein in what are conceived to be the most practical and preferred embodiments, it is recognized that departures may be made therefrom within the scope of the invention which is therefore not to be limited to the details disclosed herein but is to be accorded the full scope of the claims.

I claim:
1. Earth moving apparatus comprising a mobile frame having a bowl thereon for collecting and carrying earth, said bowl including bottom, side and rear wall means and being open at its front end, transverse scraper means proximate the front of the bottom wall means for scooping earth into the bowl, an elongated conveyor unit having front and rear ends, and support means for said conveyor unit permitting movement of the conveyor unit between a lower, operative position, and an upper, inoperative position, said support means comprising first support structure connected to the frame and supporting the conveyor unit forwardly thereon for movement principally vertically upwardly when the conveyor unit moves from said lower position to said upper position, and second support structure connected to the frame and supporting the conveyor generally rearwardly thereon for movement having a substantial rearward component when the conveyor unit moves from said lower position to said upper position, and means for selectively moving the conveyor unit from said lower to said upper position, said second support structure comprising sliding connection means between the conveyor unit and the frame.

2. Earth moving apparatus as defined in claim 1, wherein said sliding connection means comprises track means connected to the frame and means connetced to the conveyor unit slidable in said track means.

3. Earth moving apparatus as defined in claim 2, wherein said track means includes track portions positioned on both sides of the conveyor unit, said slidable means including portions extending from both sides of the conveyor unit and slidable in the respective track portions.

4. Earth moving apparatus as defined in claim 3, wherein said laterally extending portions each include a roller which rides in the respective track portion.

5. Earth moving apparatus as defined in claim 2, wherein said track means inclines upwardly and rearwardly from its front end to its rear end.

6. Earth moving apparatus as defined in claim 2, wherein said first support structure is pivotally connected to the frame for generally vertical swinging movement of the front end of the conveyor unit.

7. Earth moving apparatus comprising a mobile frame having a bowl thereon for collecting and carrying earth, said bowl including bottom, side and rear wall means and being open at its front end, transverse scraper means proximate the front of the bottom wall means for scooping earth into the bowl, an elongated conveyor unit having front and rear ends, and support means for said conveyor unit permitting movement thereof between a lower, operative position and an upper, inoperative position, said support means comprising lifting means engageable with the conveyor unit generally forwardly thereon for selectively raising the forward portion thereof so as to move the conveyor unit from said lower to said upper position, and sliding connection means between the conveyor unit generally rearwardly thereon and the frame defining a generally upward and rearward path of sliding movement of the rear portion of the conveyor unit relative to the frame between forwardmost and rearwardmost limits when the conveyor unit is raised from said lower to said upper position.

8. Earth moving apparatus as defined in claim 7, wherein said path of sliding movement defined by said sliding connection means has a forward portion extending principally vertically upwardly from said forwardmost limit and a rearward portion extending principally horizontally rearwardly from said forward portion.

9. Earth moving apparatus as defined in claim 7, wherein said lifting means comprises a forward portion of said bowl which is movable relative to the remainder of the bowl between a lower, operative position and an upper, inoperative position, said forward bowl portion having generally upwardly facing shoulder means thereon engageable with laterally extending means generally forwardly located on the conveyor unit.

10. Earth moving apparatus as defined in claim 9, wherein said forward bowl portion also has generally downwardly facing shoulder means thereon spaced upwardly from and generally opposing said first mentioned shoulder means, and said laterally extending means on the conveyor unit has substantial freedom of vertical movement between said opposed shoulder means when said forward bowl portion and said conveyor are both in their said lower, operative positions, whereby the forward portion of the conveyor is floatingly mounted within fixed limits in the operative position of the conveyor unit.

11. Earth moving apparatus comprising a mobile frame having a bowl thereon for collecting and carrying earth, said bowl including bottom, side and rear wall means and being open at its front end, transverse scraper means proximate the front of the bottom wall means for scooping earth into the bowl, an elongated conveyor unit having front and rear ends, and support means for said conveyor unit permitting movement of the conveyor unit between a lower position and an upper position, said support means comprising arm means pivotally connected to the frame and extending generally forwardly to a connection with the conveyor unit forwardly located on the conveyor unit, the front end portion of the conveyor unit being swingable between a lower position adjacent the scraper means and an upper position spaced a substantial distance above the scraper means, and track means connected to the frame and means connected to the conveyor unit generally rearwardly thereon slidable in said track means, the rear portion of the conveyor unit being slidable adjacent the top of the bowl with a substantial horizontal component of movement from a forward to a rearward position, whereby said conveyor unit is shiftable between an operative position with its front end portion in said lower position and rear end portion in said forward position wherein the conveyor unit extends generally upwardly from its front to its rear end between the side walls of the bowl as a forward barrier against loss of earth from the bowl, and an inoperative position with its front end portion in said upper position and its rear end portion in said rearward position wherein the unit generally clears the front end of the bowl for dumping, said arm means including a pair of arms pivoted to the frame at opposite sides of the bowl and a rigid cross member integrally connected to said arms and extending transversely from one arm to the other in front of the bowl.

12. Earth moving apparatus as defined in claim 11 wherein said arm means further includes a second pair of arm integrally connected to said cross member and projecting generally downwardly therefrom, the front end of the conveyor unit being pivotally connected to said second arms below the cross member.

13. Earth moving apparatus as defined in claim 11, wherein said arm means further includes a pair of forward bowl side plate portions integrally connected to said cross member and projecting generally downwardly therefrom, the conveyor unit being connected to said side plate portions for limited relative movement below said cross member.

14. Earth moving apparatus as defined in claim 11 which includes winch means connected to said cross member for selectively raising the conveyor unit from its said operative position to its said inoperative position.

References Cited

UNITED STATES PATENTS

| | | | |
|---|---|---|---|
| 2,495,336 | 1/1950 | Le Tourneau | 37—129 |
| 2,956,353 | 10/1960 | Hanner et al. | 37—126 |
| 3,210,868 | 10/1965 | Liess | 37—8 |

FOREIGN PATENTS 122,716  10/1927  Switzerland.

ANTONIO F. GUIDA, *Primary Examiner.*

ABRAHAM G. STONE, *Examiner.*

R. C. HARRINGTON, *Assistant Examiner.*